July 23, 1946. C. E. KOCH 2,404,732
DRYING APPARATUS
Filed Sept. 11, 1943 2 Sheets-Sheet 1
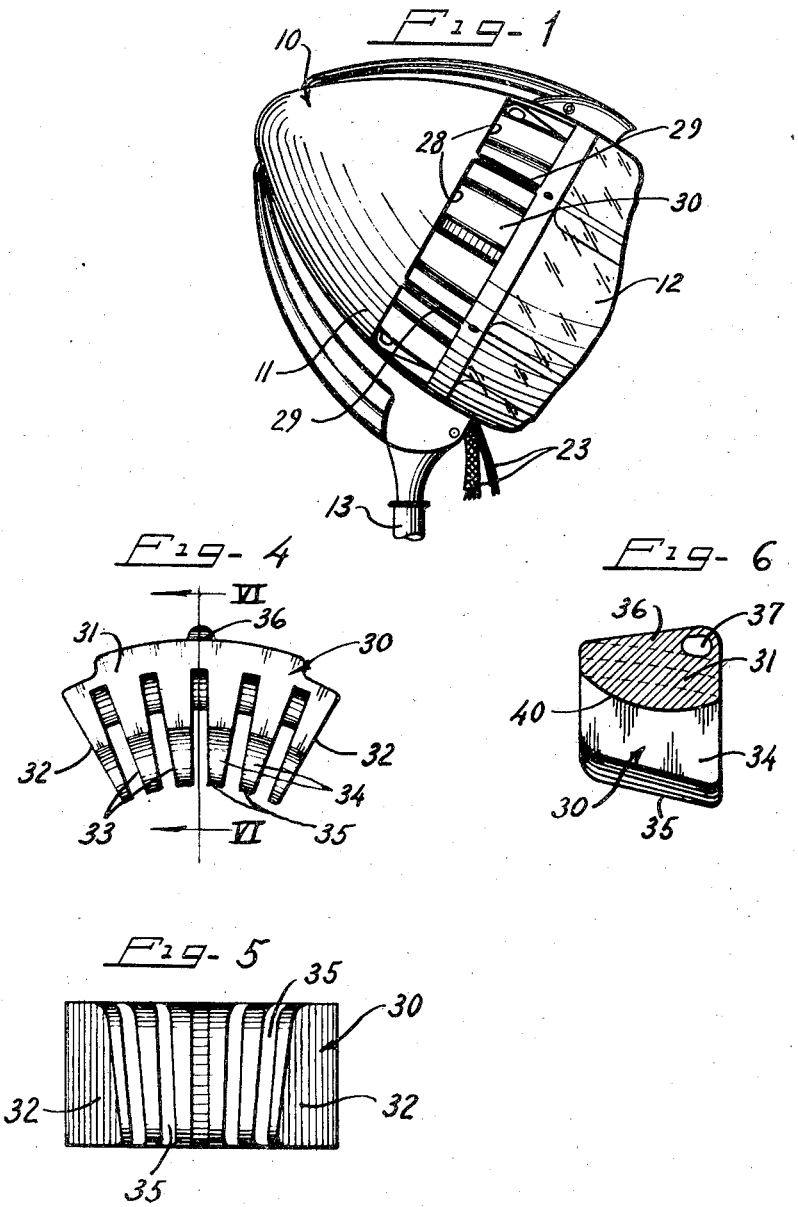
Inventor
CARL E. KOCH July 23, 1946.  C. E. KOCH  2,404,732
DRYING APPARATUS
Filed Sept. 11, 1943  2 Sheets-Sheet 2
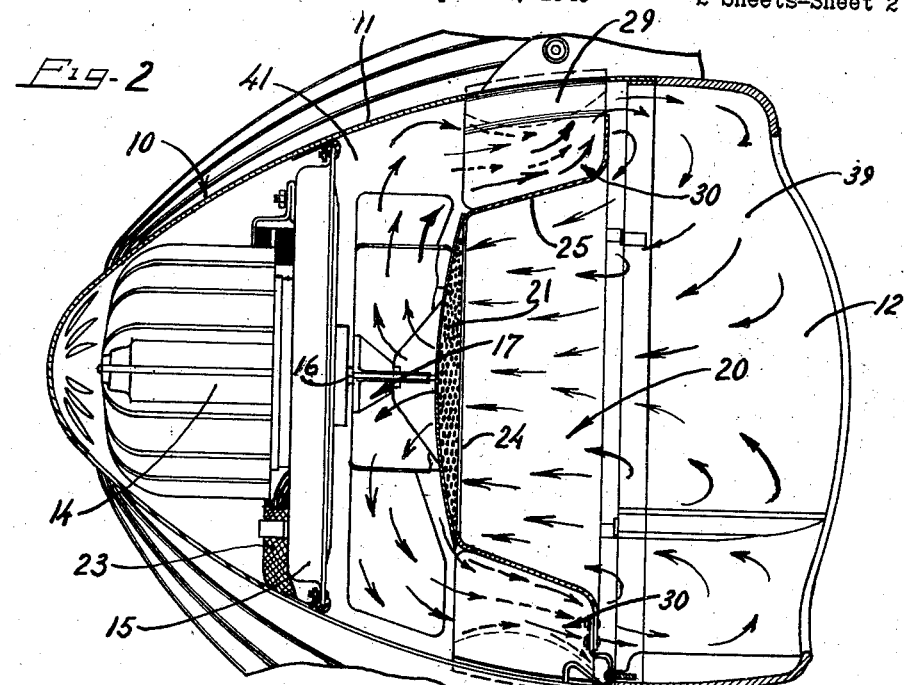
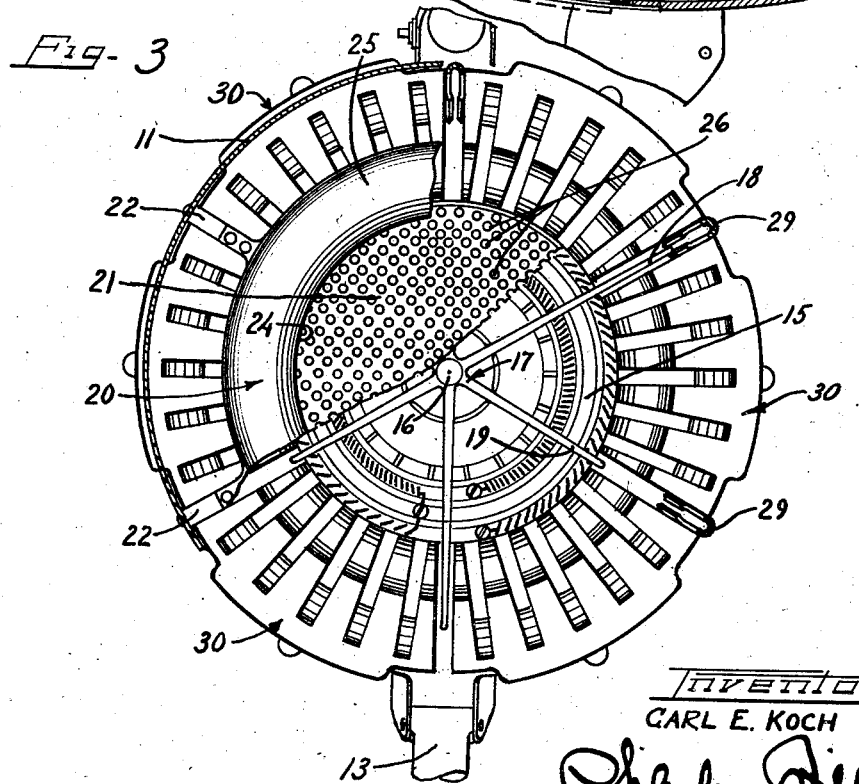
Inventor
CARL E. KOCH
by Charles Hill
Attys.

Patented July 23, 1946

2,404,732

UNITED STATES PATENT OFFICE 2,404,732

DRYING APPARATUS

Carl E. Koch, Chicago, Ill., assignor to American Beauty Products Co., Chicago, Ill., a corporation of Illinois Application September 11, 1943, Serial No. 501,925

1 Claim. (Cl. 34—81)

The present invention relates to improvements in a drying apparatus. More particularly, the invention concerns an improved means for dehydrating moisture laden drying fluid in a recirculating dryer unit.

It is a primary object of the present invention to provide a simple and effective means for removing the moisture from the drying fluid employed in a recirculating dryer to speed up the drying operation and to render it more efficient.

In drying apparatus which depends for the accomplishment of the drying operation upon the continuous recirculation of the same drying medium, the effectiveness of the drying operation is diminished by the absorption of moisture by the medium employed. The present invention contemplates a novel means for dehydrating the drying medium so as to render it capable of absorbing more moisture upon being recirculated.

It is a further object of the present invention, therefore, to provide a method including as one of the steps the passing of the drying fluid over a tortuous path while it is being treated hygroscopically to remove moisture therefrom.

It is also an object of the present invention to provide means for accomplishing this purpose.

Another and further object of the invention is to provide an element composed of hygroscopic material of the class including silica gel, calcium chloride and other similar desiccating agents over which the moisture laden fluid must pass and which expose a maximum surface area of the hygroscopic material to the fluid.

A still further object of the present invention is to provide an element composed of hygroscopic material for the dehydration of the drying fluid which is easily and readily removed from the dryer for replacement when it has become saturated with moisture or for any other reason that its replacement may be desirable.

It is a further object of the present invention to provide an annular element for a dryer unit comprising a plurality of replaceable segments or units of arcuate form each of which possesses the aforementioned attributes and may readily be replaced independent of any of the adjoining segments or units forming the element whenever desired.

In accordance with the general features of the present invention there is provided a method of dehydrating recirculated moisture laden drying fluid comprising the steps of withdrawing the moisture laden fluid from the drying area, hygroscopically treating the fluid while it is directed along a cascading and tortuous path adjacent to the drying area and thereafter returning the substantially moisture free fluid to the drying area.

In accordance with other features of the present invention there is provided in a dryer unit means for creating an air stream through the drying area and replaceable hygroscopic means enveloping the air stream and directing it in a substantially tortuous path to remove moisture therefrom before returning the air to the drying area.

In accordance with still further features of the present invention there is provided as an article of manufacture an element to be inserted in a dryer unit for dehydrating the moisture laden drying fluid, said element being composed of a hygroscopic material and having a plurality of channels for directing the moisture laden fluid therethrough so as to contact the hygroscopic material.

Other objects and features of the present invention will become apparent from the following description of one of the preferred embodiments of the invention as related to a hair dryer unit shown in detail in the accompanying drawings, in which:

Figure 1 represents an elevation of the dryer unit with parts broken away;

Figure 2 represents a vertical cross-section taken through the device illustrated in Figure 1 and having parts broken away to illustrate the path of travel of the drying medium, in this instance, air, through the apparatus;

Figure 3 is a partial section taken transversely of the apparatus and having parts broken away to illustrate more clearly the disposition of the dehydrating element of the present invention;

Figure 4 is a plan view of one of the segments forming the dehydrating element of the present invention;

Figure 5 is a frontal view of the segment illustrated in Figure 4; and

Figure 6 is a vertical cross-section taken along the line VI—VI through the segment illustrated in Figure 4.

The method and means of the present invention is particularly adapted to application in any conventional form of drying apparatus or the like. The hair dryer illustrated in Figure 1 and designated generally by the reference character 10 represents a conventional form of dryer unit such as is employed in the home, beauty parlor or other like establishments for the care and drying of human hair.

The dryer 10 is illustrated as comprising a hood 11 equipped with a guard portion 12 which is adapted to encircle the head of the person employing the dryer for the removal of moisture from the hair, said hood being pivotally mounted upon a base 13 for supporting the same from the floor. The hood 11 encloses an electric motor 14 mounted on the back of the insulating member forming a part of the heating element 15 comprising a plurality of resistance coils. The heating element 15 is, in turn, mounted internally of the hood 11.

Electrical current for operating the motor 14 and energizing the electrical resistance coils of the heating element 15 is supplied by the electrical cables 23 extending out of the hood 11 and adapted to be connected to any suitable source of electric energy such, for example, as an ordinary convenience outlet. The shaft 16 of the motor 14 extends through a central aperture in the insulating member of the heating element 15 and supports thereon a multi-bladed fan 17. The fan 17 is advantageously of a recirculatory type and comprises a plurality of radially extending long blades 18 interspersed by an equal number of relatively shorter blades 19.

Disposed adjacent to the guard portion 12 and supported from a plurality of spaced radially extending straps 22 suitably secured to the interior of the hood 11 is a deflector 20. The entire outer periphery of the deflector 20 is spaced from the internal surface of the hood 11. The deflector 20 is provided with a centrally disposed aperture 24 adjacent the tapered end of the substantially frusto-conically shaped portion 25 which extends to a point adjacent the fan 17. A screen 21 is mounted in the aperture 24 and suitably secured to the deflector 20, said screen having a plurality of apertures 26 and serving to prevent the possibility of the hair from becoming engaged in the blades 18 and 19 of the fan 17.

The hood 11 is provided on its external surface at a point adjacent the disposition of the deflector 20 therewithin with a plurality of annularly arranged, substantially oblong apertures 28 which are spaced apart by segments of the hood 11 bent inwardly to form substantially spring-like elements 29. A single substantially arcuate segment or desiccator 30 composed of a suitable hygroscopic material is adapted to be inserted in each of the apertures 28 so as to extend into the interior of the hood 11. The desiccators 30 which advantageously take the form illustrated in Figures 4 to 6, inclusive, of the accompanying drawings are held in place and frictionally engaged by the elements 29.

The desiccator units 30, a plurality of which are disposed in annular arrangement about the entire periphery of the hood 11, comprise a rib portion 31 of substantially arcuate form flanked on the ends by radially extending wedged-shaped end walls 32. Disposed between the end walls 32 and separated by a plurality of radially extending grooves or channels 33 are a plurality of prongs 34 which present a substantially serrated appearance for the inwardly projecting periphery of the unit 30. The desiccators 30, as previously indicated, are inserted between adjacent elements 29 and frictionally engaged thereby so that the prongs 34 thereof extend in substantially radial relation with respect to the internal surface of the hood 11. The sloping surfaces 35 on each of the prongs 34 of the desiccators 30 contact the outermost surface of the substantially frusto-conically shaped portion 25 of the deflector 20 when in place.

The rib portion 31 of each of the desiccators 30 is provided with an upwardly projecting lug portion 36 in which is formed a suitable aperture 37 which will permit the insertion of the finger of the operator to aid in grasping each unit to remove it from the aperture 28 when it is desired to replace the same. The units 30 which have been employed in the drying of hair so that they have become saturated with moisture are removed from the dryer 10 and subjected to an operation for removing or driving out the moisture collected therein during the drying operation. This dehydration operation may be accomplished by baking the units 30 at a high temperature or any other suitable procedure may be employed for removing the moisture and rendering the units capable of being employed over again in a subsequent drying operation.

In the operation of the apparatus, the fan 17 actuated by the shaft 16 from the electric motor 14 serves to draw the air through the screen 21 and out of the drying chamber 39 formed by the guard portion 12 and the front end of the hood 11 in which the head of the person whose hair is being dried is inserted. The fan 17 causes the air withdrawn from the chamber 39 into the fan chamber 41 to pass in a radial direction toward the innermost surface of the hood 11 and thence outward in the direction of the flare along the external surface of the frusto-conical portion 25 of the deflector 20 about the outer periphery of said deflector 20 into the chamber 39 in the course indicated generally by the arrow in Figure 2 of the drawings.

By reason of the insertion through the hood 11 of the desiccator units 30 which extend about and completely encompass the outer surface of the frusto-conical portion 25 of the deflector 20, the air in being recirculated by the fan 17 along the outer periphery of the deflector 20 is, of necessity, caused to come in contact with said units 30. The moist air passes through the slots 33 separating the prongs 34 of the units 30 and is thereby effectively exposed to contact with hygroscopic material of which the desiccators are fabricated. This exposure of the moisture laden air in the surfaces of the units 30 results in the withdrawal of moisture from the air by absorption of the moisture by the hygroscopic material.

The air being discharged by the fan 17 in passing radially outwardly from the screen 21 is substantially uniformly distributed about the entire external surface of the frusto-conical portion 25 of the deflector 20 and is, therefore, caused to pass substantially uniformly between the radially extending prongs 34 of the several units 30. In so doing, the air laden with moisture is directed over a relatively tortuous and devious path in passing from the fan chamber 41 back to the drying chamber 39.

The units 30 are particularly advantageous by reason of the fact that the several channels 33 formed in the internal arcuate face of the units greatly increase the surface of contact of the material with the air and thereby enable the moisture to be readily withdrawn therefrom and absorbed by the hygroscopic material. It will be noted that the air not only comes in contact with the opposite walls of the channels 33 forming the sides of the prongs 34 but also with the substantially curved surface 40 disposed at the base of the channels 33 between the prongs associated therewith.

It will be apparent that while the present invention has been described with particular reference to a hair drying unit it is equally well adapted to use in any form of dryer employing the principle of recirculation of the drying medium therein. Indeed, the same principle of operation may even be employed with any fluid which is ladened with an evaporable liquid which it is desired to remove therefrom so as to render the fluid more readily capable of taking up more liquid in the course of the operation in which it is employed, whether it be a drying operation or not.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In a drier assembly having spaced inner and outer walls defining a drying area through which air is circulated for performing a drying operation, means for creating an air stream through the drying area, and a plurality of replaceable hygroscopic means disposed adjacent said drying area, said hygroscopic means being disposed extending through the outer wall and in the path of the air stream and shaped to define with the inner wall a restricted and substantialy tortuous path for the air stream exposing thereto an area of contact in excess of the greatest plane dimension of the means and causing substantially all of the air to come in contact with the hygroscopic means to remove moisture therefrom before returning it to the drying area, and said hygroscopic means each having a grasping portion projecting outwardly of said outer wall for separate removal of said means without disassembly or opening of said drier assembly.

CARL E. KOCH.